(No Model.)

A. G. SNELL.
CANOPY HOLDER FOR CHILDREN'S CARRIAGES.

No. 281,311. Patented July 17, 1883.

Witnesses

Adolphus G. Snell
Inventor
By Atty.

UNITED STATES PATENT OFFICE.

ADOLPHUS G. SNELL, OF NEW HAVEN, CONNECTICUT.

CANOPY-HOLDER FOR CHILDREN'S CARRIAGES.

SPECIFICATION forming part of Letters Patent No. 281,311, dated July 17, 1883.

Application filed May 22, 1883. (No model.)

*To all whom it may concern:*

Be it known that I, ADOLPHUS G. SNELL, of New Haven, in the county of New Haven and State of Connecticut, have invented a new Improvement in Canopy-Holders for Children's Carriages; and I do hereby declare the following, when taken in connection with accompanying drawings and the letters of reference marked thereon, to be a full, clear, and exact description of the same, and which said drawings constitute part of this specification, and represent, in—

Figure 1:
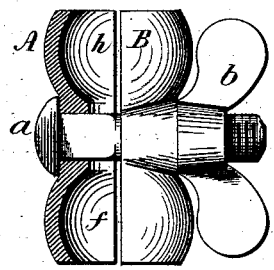
Figure 2:
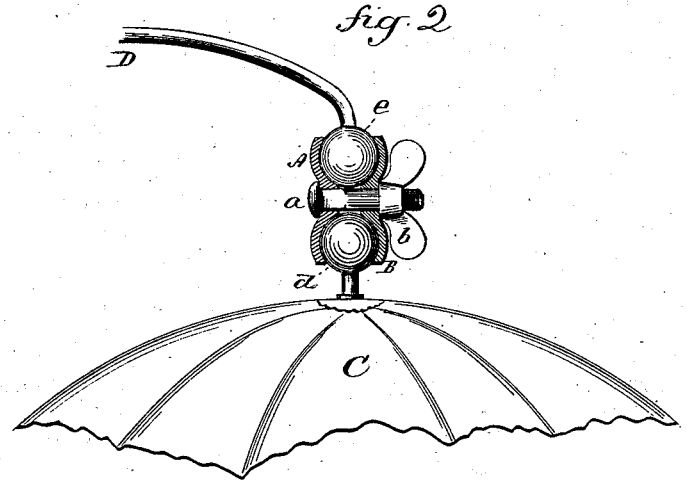
Figure 3:
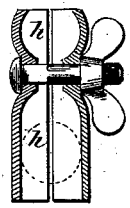

Figure 1, a sectional side view of the socket; Fig. 2, a sectional side view showing the socket as applied to the support of the canopy; Fig. 3, a modification.

This invention relates to a device for holding the umbrella or parasol-like canopy over children's carriages, the object being to make a connection having a universal joint, whereby the canopy may be turned into any desired position relative to the carriage. Ball-and-socket joints have been constructed for such adjustment of the canopy; but they have been so complicated and require so much mechanical fitting that they are too expensive for practical work. By my invention the joint is very simple in its construction, and permits a more extended range of adjustment than by previous joints; and it consists in a socket divided longitudinally into two parts, at each end of the two parts a cavity formed corresponding at one end to the ball on the canopy and at the other to a ball on the support, with an intermediate screw, whereby the said two parts may be clamped upon said two balls, and permit the adjustment of the canopy to any desired position relative to the carriage, and as more fully hereinafter described.

A represents one part and B the other part of the socket. Midway of their length a bolt, *a*, passes transversely through them, with a head upon one end and a nut, *b*, upon the opposite end, whereby the two parts may be forced together as a clamp, or separated, as occasion may require.

C represents the canopy, and D the support by which the canopy is suspended. The canopy is here represented as of umbrella shape, and at its tip is provided with a ball, *d*. At the end of the upright is a similar ball, *e*. The two parts of the socket at each end are constructed with an internal cavity, *f h*, corresponding, respectively, to the balls *d e*, and so that the two parts of the socket will embrace, respectively, the two balls *d e*, and thereby secure the canopy to the support, and by turning the nut *b* hard down to clamp the said two balls the canopy is firmly held in a fixed position, from which it may be turned to any other desired position by simply loosening the screw, turning the canopy to that position, and then resetting the clamp. These two parts are shaped so that each may be cast complete and finished by the tumbling process, and therefore no mechanical labor required upon them, unless some extra finish for the surface be required; hence the socket is of the cheapest possible character.

The socket may be made, as shown, to embrace one ball—say the one on the support—to a greater extent than it does the lower ball, and whereby by slackening the nut the canopy may be removed from the socket without necessarily disengaging the socket from the ball on the support, or vice versa.

While I prefer to make the hole through the two parts, and introduce the headed bolt through those holes, with a nut upon the opposite end, it will be evident that one of the parts may be tapped and a screw introduced through the other as a means for clamping the two parts together.

In some cases the joint is preferably made in the upright or support near the body. In that case the two balls will be made at that point and the socket there applied; or wherever it is desirable to apply the socket, at that point the two balls will be provided.

Instead of making both ends for ball-and-socket joint, one end may be made to grasp the end of a stem, as seen in Fig. 3, the other socket to receive the ball. This affords a considerable extent of adjustment, but not so much as in the case of a double ball and socket; and instead of the recess at one end being straight to grasp the rod in axial line, it may have its recess transverse, as indicated in broken lines, Fig. 3, and so as to grasp the rod, or whatever it may be, at right angles to the axis of the socket. In either case the cavities are formed substantially alike in each part, and the clamping device between the two sockets.

The socket itself is made as an article of manufacture, with or without the balls, the manufacturers in some cases providing the canopy and the support with the respective balls, to which the socket may be applied. I therefore do not wish to be understood as limiting my invention to the balls as a part of the article, although they are necessary to its use.

I claim—

1. The herein-described socket for the adjustment of carriage-canopies and like purposes, consisting of the two parts A B, each constructed upon its inner side with cavities $f\ h$, forming sockets at the respective ends, combined with a clamping device through the two parts intermediate between the sockets, whereby the said sockets may be clamped to secure the canopy and permit its adjustment, substantially as described.

2. The socket composed of the two parts A B, each having a cavity, $f\ h$, formed upon the inner side, with an intermediate clamping-screw through the two parts, combined with the balls $d\ e$ on the respective parts to be connected, one of the cavities of said socket constructed to embrace one of the balls to a greater extent than the other, whereby the one ball may be released and the socket still retained upon the other, substantially as described.

ADOLPHUS G. SNELL.

Witnesses:
JOHN E. EARLE,
JOS. C. EARLE.